Nov. 20, 1923.  1,475,114
A. HAMELSTROM
PISTON
Filed Feb. 20, 1922   2 Sheets-Sheet 1

Arvid Hamelstrom
INVENTOR

BY Victor J. Evans
ATTORNEY

WITNESS:

Nov. 20, 1923. 1,475,114
A. HAMELSTROM
PISTON
Filed Feb. 20, 1922 2 Sheets-Sheet 2
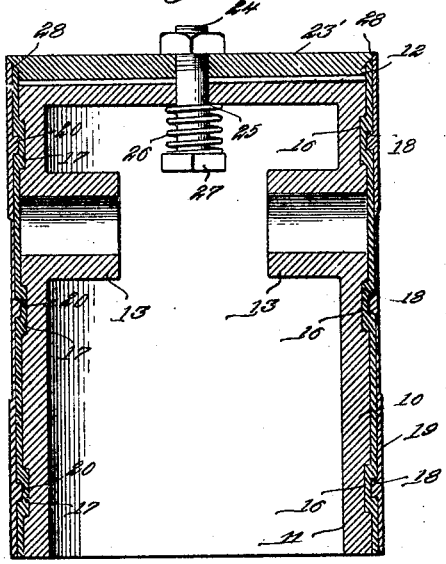
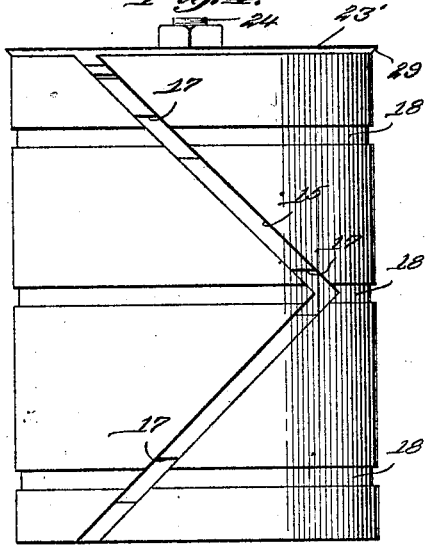
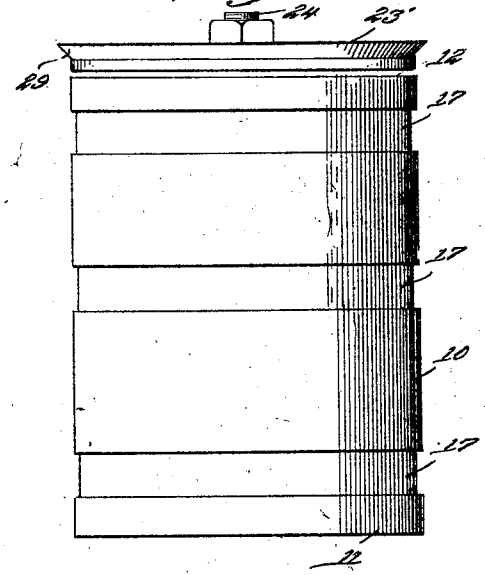

Patented Nov. 20, 1923.

1,475,114

UNITED STATES PATENT OFFICE.

ARVID HAMELSTROM, OF NEKOMA, NORTH DAKOTA.

PISTON.

Application filed February 20, 1922. Serial No. 538,068.

*To all whom it may concern:*

Be it known that I, ARVID HAMELSTROM, a citizen of the United States, residing at Nekoma, in the county of Cavalier and State of North Dakota, have invented new and useful Improvements in Pistons, of which the following is a specification.

This invention relates to engine pistons especially adapted for internal combustion engines.

An object of the present invention is the provision of a piston which forms a perfect seal between its outer periphery and the cylinder wall, so as to prevent loss of compression and leakage or pumping of oil.

Another object is the provision of means whereby a worn cylinder may be made leak proof by the use of the invention.

Another object is the provision of a piston of this character, which is simple in construction, positive and effective in operation and which will increase the power of an engine as well as reduce its cost of operation.

With the above and other objects in view, the invention further includes the following novel features and details of construction, to be hereinafter more fully described, illustrated in the accompanying drawings and pointed out in the appended claim.

In the drawings:—

Figure 3 is a central longitudinal sectional view of the same.

Figure 4 is an elevation of the piston with the outer sleeve removed.

Figure 5 is a similar view with the inner sleeve removed.

Figure 1:
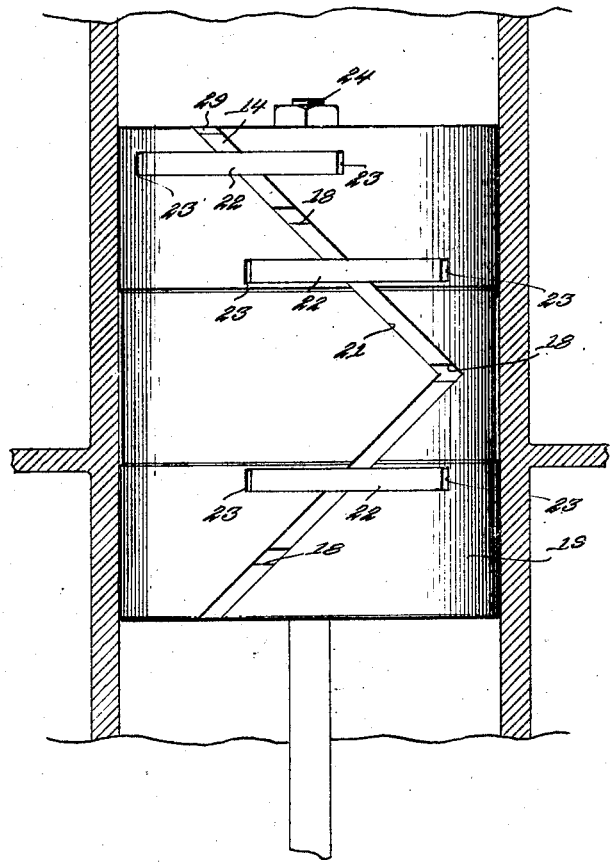
Figure 1 is an elevation of a piston constructed in accordance with the invention and showing a portion of an engine cylinder in section.
Figure 2:
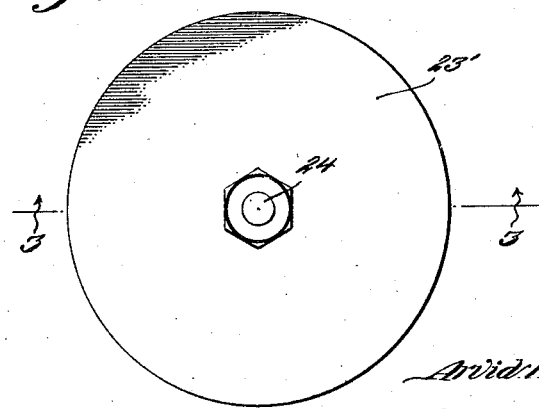
Figure 2 is a plan view of the piston.

Referring in detail to the drawings, wherein like characters of reference denote corresponding parts, the body of the piston is indicated at 10 and is of the usual cup-shape having an annular cylindrical wall 11 and a head 12. Located within the piston are oppositely arranged bearings 13 for connection with the usual connecting rod, as will be readily understood.

Surrounding the outer surface of the piston 10 is an expansible metallic sleeve 14, which is split longitudinally in V-shaped formation as at 15, so as to provide an interlocking engagement between the split ends of the sleeve.

Located upon the inner periphery of the sleeve is a plurality of circumferentially extending flanges 16, which are adapted to be received in annular grooves or seats 17 provided in the outer surface of the piston 10. These grooves or seats may be of any desired width and may be formed like the usual packing ring grooves of an ordinary piston. The outer surface of the sleeve 14 is provided with circumferentially arranged grooves or seats 18.

Surrounding the sleeve 14 is a contractible sleeve 19 which is also provided with circumferentially disposed flanges or ribs 20 extending around its inner periphery, for entrance into the grooves 18 of the sleeve 14. The sleeve 14 is thus held against longitudinal movement with respect to the piston 10 and the sleeve 19 is held against like movement with respect to the sleeve 14.

Like the sleeve 14, the sleeve 19 is split in substantially V-shaped formation as shown at 21 and this split is bridged by a plurality of connecting strips 22, whose opposite ends enter opposed slots 23 provided in the adjacent edges of the V-shaped split 21. This permits of a change in the diameter of the sleeve 19, while keeping the adjacent side edges of the sleeve ends in proper alignment. Both the sleeve 14 and the sleeve 19 are preferably co-extensive in length with the piston 10.

The piston is provided with a supplemental head 23' which has extending therefrom a concentrically arranged pin or bolt 24. This pin or bolt 24 enters an opening 25 provided in the head 12 of the cylinder and is surrounded by a spring 26, held in position by a nut 27, whereby the tension of the spring may be adjusted. The diameter of the head 23' is such as to extend over the adjacent faces of the sleeves 14 and 19 and the edges of the sleeves are beveled as indicated at 28 for engagement with the beveled edge 29 of the overlying edge of the head 23. A ground surface is provided between the beveled edges 28 and 29 and as the head 23 is yieldingly held in place, a perfect fit between this head and the ends of the sleeves is provided so as to prevent leakage of compression, or oil. A maximum amount of power is thus delivered by the piston, so that the fuel consumption is reduced, as is also the amount of oil.

A proper working fit between the piston and cylinder is always provided, as the sleeves are automatically expanded to take up wear.

These sleeves may be applied to pistons of the usual construction and may therefore take the place of over sized pistons after a cylinder block has been rebored, or a piston as above set forth may be fitted within a worn or rebored cylinder and will provide a proper working fit therein.

The invention is susceptible of various changes in its form, proportions and minor details of construction and the right is herein reserved to make such changes as properly fall within the scope of the appended claim.

Having described the invention what is claimed is:—

The combination with a piston, of an expansible sleeve split longitudinally in V-shaped formation, an interlocking engagement between the sleeve and piston, a contractible sleeve split longitudinally in V-shaped formation and having its adjacent end provided with circumferentially disposed oppositely arranged slots, strips extending across the V-shaped split contractible sleeve and entering said slots and an interlocking engagement between the expansible and contractible sleeves.

In testimony whereof I affix my signature.

ARVID HAMELSTROM